O. BAJMA-RIVA.
WIRE CONNECTOR.
APPLICATION FILED NOV. 4, 1915.

1,203,565.          Patented Nov. 7, 1916.

Inventor:
Oreste Bajma-Riva
By: [signature] Atty

UNITED STATES PATENT OFFICE.

ORESTE BAJMA-RIVA, OF MILAN, ITALY.

WIRE-CONNECTOR.

1,203,565.   Specification of Letters Patent.   Patented Nov. 7, 1916.

Application filed November 4, 1915. Serial No. 59,658.

*To all whom it may concern:*

Be it known that I, ORESTE BAJMA-RIVA, subject of the King of Italy, residing at 10 Via Salaino, Milan, Italy, have invented certain new and useful Improvements in Wire-Connectors, of which the following is a specification.

This invention has for its object an automatical device for the mechanical and electrical joining of wires and the like.

Figure 1:
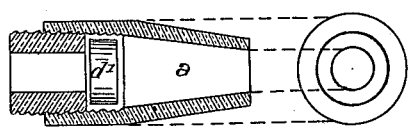
Figure 2:
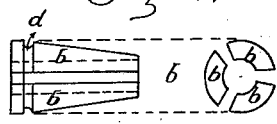
Figure 3:
Figure 4:
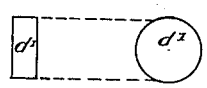
Figure 5:
Figure 6:
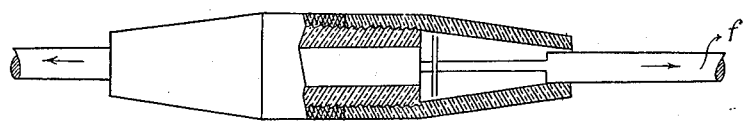
Figure 7:
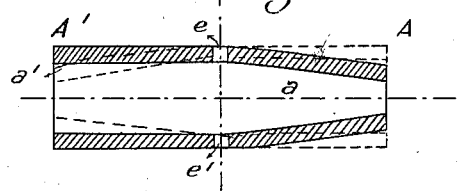
Figure 8:
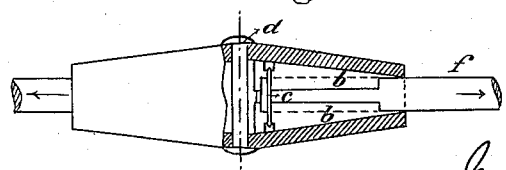

In the accompanying drawing: Figure 1 is a longitudinal section and plan view of a coupling sleeve. Fig. 2 shows a coupling cone in section and in plan view. Fig. 3 is a detail view of a ring. Fig. 4 is a section and plan view of a diaphragm. Fig. 5 is a section through a means for limiting the backward movement of the coupling cone, and Fig. 6 shows partly in section a coupling sleeve in working position. Figs. 7 and 8 show a modified construction.

Referring first to Figs. 1–6 of the drawing, the improved device comprises a conical recess $a$ having a circular or other suitable cross section, into which a hollow truncated cone $b$ is located. This cone $b$ is longitudinally cut into two, three or many portions, which are held fast together by means of an elastic ring $c$ of metal. The ring $c$ is opened at a point of its circumference as shown in Fig. 3 being thus enabled to exert a clamping action upon the sections of the member $b$, so that a hole having about the shape of a regular truncated cone is obtained. The ring $c$ is forced into the groove $d$ provided in the member $b$ (Fig. 2). A diaphragm $d'$ (Fig. 4), or other suitable means $e$ (Fig. 5), serves to limit the backward movement of the truncated cone $b$, which is capable of expansion under the action of a wire led through it. The pressure of the elastic ring $c$ causes the sections of the member $b$ to closely bear against the wire and to follow the movements of the same. By forcing the diaphragm $d'$ by suitable means against the greater base of the cone $b$, this is locked in the conical recess $a$ and prevented from any backward movement. Should a mechanical strain, acting in the direction of the arrow as indicated in Fig. 6, have the tendency to draw the wire out of the device, the reaction engendered by the recess $a$ against which the member $b$ bears, will cause the forcing of the sections $b$ toward the center of the wire, producing in this way a friction by which the wire is held into the device and prevented from any sliding movement.

Figs. 7 and 8 show a preferred construction of the device and more specially the construction of the socket including the conical recess for the sections which are intended to grasp the ends of the wire to be joined. According to this construction, a cylindrical tube A—A' is cut in the desired length and provided with two symmetrical holes $e$—$e$, one of the ends ($a$) of the said tube being then compressed so as to assume the shape of a truncated cone, and one of the sections $b$, provided with the elastic ring $c$, placed in position. After this, a pin $d$, the ends of which are riveted, is driven through the holes $e$—$e$ and the second section $b$ provided with the elastic ring, placed in position. The other end ($a'$) of the tube A—A' is then sharpened in the same way as the end ($a$) (see dotted lines on Fig. 7). Thus made, the ends of the wire to be joined can be led into the device and the joining takes place automatically owing to the tension of the wire.

Having now particularly described the nature of my said invention and in what manner the same is to be performed, what I claim is:

A connector for wires and the like, comprising in combination, a double cone sleeve, multi-partite truncated cones adapted to be introduced into said sleeve from opposite ends and adapted to receive the ends of a wire, slitted rings adapted to clamp the parts of said cones on said wires and frictionally engaging the inner walls of said sleeve, and means for limiting the backward movement of said truncated cones, substantially as described.

In testimony whereof I have affixed my signature in presence of two witnesses.

ORESTE BAJMA-RIVA.

Witnesses:
 ALBERTE PERZ,
 ILO C. FUNK.